(12) United States Patent
Lo et al.

(10) Patent No.: US 8,393,738 B2
(45) Date of Patent: Mar. 12, 2013

(54) ILLUMINATION MODULE AND PROJECTOR

(75) Inventors: Wei-Cheng Lo, Hsin-Chu (TW);
Kun-Chieh Chan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 380 days.

(21) Appl. No.: 12/835,426

(22) Filed: Jul. 13, 2010

(65) Prior Publication Data

US 2011/0188006 A1    Aug. 4, 2011

(30) Foreign Application Priority Data

Jan. 29, 2010  (CN) .......................... 2010 1 0106969

(51) Int. Cl.
*G03B 21/16* (2006.01)
*F21V 29/00* (2006.01)

(52) U.S. Cl. ............ 353/57; 353/61; 362/294; 362/345; 362/373

(58) Field of Classification Search ............ 353/52, 353/57, 58, 60, 61; 362/294, 345, 373
See application file for complete search history.

(56) References Cited

U.S. PATENT DOCUMENTS 7,179,048 B2   2/2007  Huang et al.
7,513,626 B2   4/2009  Adachi et al.
2003/0076683 A1*  4/2003  Chang ........................... 362/294

FOREIGN PATENT DOCUMENTS

| CN | 1790155 | 6/2006 |
| JP | 2008233150 | 10/2008 |
| TW | 477432 | 2/2002 |
| TW | I252368 | 4/2006 |
| TW | I281090 | 5/2007 |

OTHER PUBLICATIONS

China Patent Office Action issued on Feb. 21, 2012.

* cited by examiner

*Primary Examiner* — William C Dowling
(74) *Attorney, Agent, or Firm* — WPAT PC; Justin King (57) ABSTRACT

An illumination module includes a light source, a supporting element, a guiding tube and an airflow generator. The supporting element is fixed relative to the light source. The guiding tube is pivoted to the supporting element and adjacent to the light source. The guiding tube is capable of moving between a first position and a second position relative to the light source. The airflow generator has an airflow outlet and is capable of generating an airflow. The airflow outlet is adjacent to the guiding tube. The airflow flows into the light source through the guiding tube. The invention also provides a projector with the illumination module.

11 Claims, 7 Drawing Sheets

ILLUMINATION MODULE AND PROJECTOR

CROSS-REFERENCE TO RELATED APPLICATION

This application claims the priority benefit of China application serial no. CN201010106969.9, filed on Jan. 29, 2010. The entirety of the above-mentioned patent application is incorporated herein by reference and made a part of this specification.

BACKGROUND

1. Technical Field

The invention relates to an illumination module and particularly to a projector with the illumination module.

2. Description of the Related Art

A conventional projector includes a light source, an airflow generator, a light valve and a projection lens. The light source provides an illumination beam. The light source includes a reflector and a lampwick. At least a portion of the lampwick is disposed in the reflector. The light valve is located in a transmission path of the illumination beam and the light valve can convert the illumination beam into an image beam. The projection lens is located in a transmission path of the image beam and the projection lens can project the image beam onto a screen.

The airflow generator generates an airflow to dissipate heat from the light source. Due to the phenomenon of natural convection generated by the gravity effect, the temperature of an upper surface of the lampwick of the light source is higher than the temperature of a lower surface of the lampwick of the light source. The difference between the temperature of the upper surface and the temperature of the lower surface should be controlled within a certain range such that the lampwick is not damaged.

The projector may be used in the upright state or the upside-down state and techniques that the temperature of the lampwick is controlled by means of guiding the airflow generated by the airflow generator have been disclosed in some patents, such as Taiwan Pat. No. 477432, Taiwan Pat. No. I252368, Taiwan Pat. No. I281090, U.S. Pat. Nos. 7,179,048 and 7,513,626. However, the methods of guiding the airflow of the conventional techniques can not satisfy the various requirements of other designers.

BRIEF SUMMARY

The invention provides an illumination module having a guiding tube. The guiding tube of the illumination module may move relative to the light source.

The invention provides a projector having a guiding tube of an illumination module. The guiding tube may move relative to the light source.

Other advantages and objects of the invention may be further comprehended through the technical features disclosed in the invention.

In order to achieve one or part of or all the objectives or other objectives, in an embodiment of the invention, the illumination module includes a light source, a supporting element, a guiding tube and an airflow generator. The supporting element is fixed relative to the light source. The guiding tube is pivoted to the supporting element and adjacent to the light source. The guiding tube is capable of moving between a first position and a second position relative to the light source. The airflow generator has an airflow outlet and is capable of generating an airflow. The airflow outlet is adjacent to the guiding tube. The airflow flows into the light source through the guiding tube.

In an embodiment of the invention, the airflow generator is fixed relative to the light source.

In an embodiment of the invention, the airflow generator is fixed to the guiding tube so that the airflow generator is capable of moving with the guiding tube.

In an embodiment of the invention, the illumination module further includes an additional weight structure disposed at the guiding tube. The additional weight structure is capable of generating a moving torque (e.g. a swinging toque) relative to a pivot joint between the guiding tube and the supporting element.

In an embodiment of the invention, the additional weight structure is a metal block fixed to the guiding tube.

In an embodiment of the invention, the additional weight structure includes a rod and a hammer. The rod is fixed to the guiding tube. An end of the rod and the guiding tube are pivoted to the supporting element. The hammer is disposed at the another end of the rod.

In order to achieve one or part of or all the objectives or other objectives, in an embodiment of the invention, the projector includes a casing, the illumination module, a light valve and a projection lens. The illumination module is disposed in the casing. The light source is capable of generating an illumination beam. The light valve is disposed in the casing and located in a transmission path of the illumination beam. The light valve is capable of converting the illumination beam into an image beam. The projection lens is located in a transmission path of the image beam. The projection lens is capable of projecting the image beam onto a screen.

The above embodiments of the invention at least have one of the following advantages. Due to the guiding tube may move between the first position and the second position relative to the light source, the airflow generated by the airflow generator can be guided by the guiding tube to flow into the light source from different regions of the guiding tube. Therefore, according to the heat distribution of the light source, the airflow can be designed to directly blow to a region adjacent to the light source where more heat accumulates when the illumination module is used in various position states. Thus, the light source can be prevented from being damaged due to overheating.

Other objectives, features and advantages of the invention will be further understood from the further technological features disclosed by the embodiments of the invention wherein there are shown and described preferred embodiments of invention, simply by way of illustration of modes best suited to carry out the invention.

BRIEF DESCRIPTION OF THE DRAWINGS

The accompanying drawings are included to provide a further understanding of the embodiments of the invention, and are incorporated in and constitute part of this specification. The drawings illustrate embodiments of the invention and, together with the description, serve to explain the principles of the invention.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

[First Embodiment]

Figure 1A:
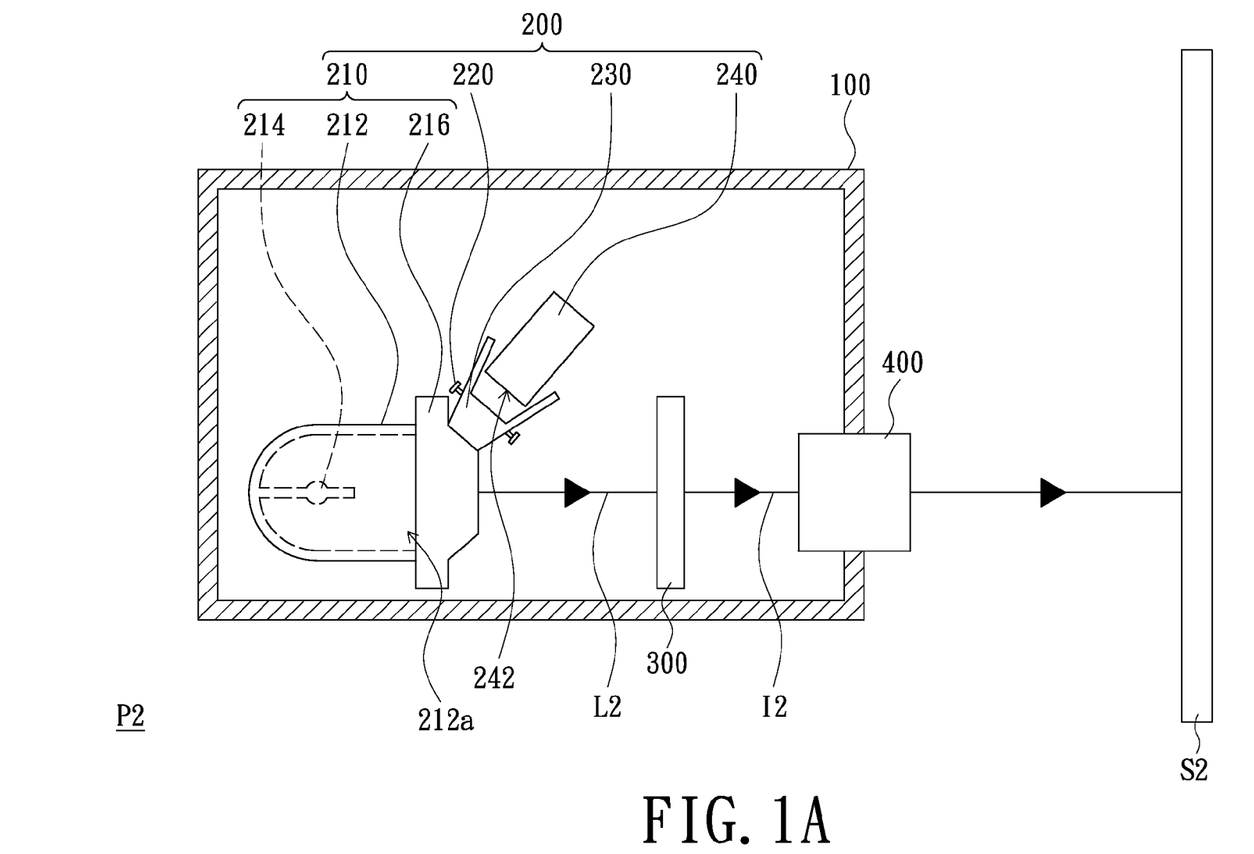
FIG. 1A is a schematic view of a projector in accordance with a first embodiment of the invention.
Figure 1B:
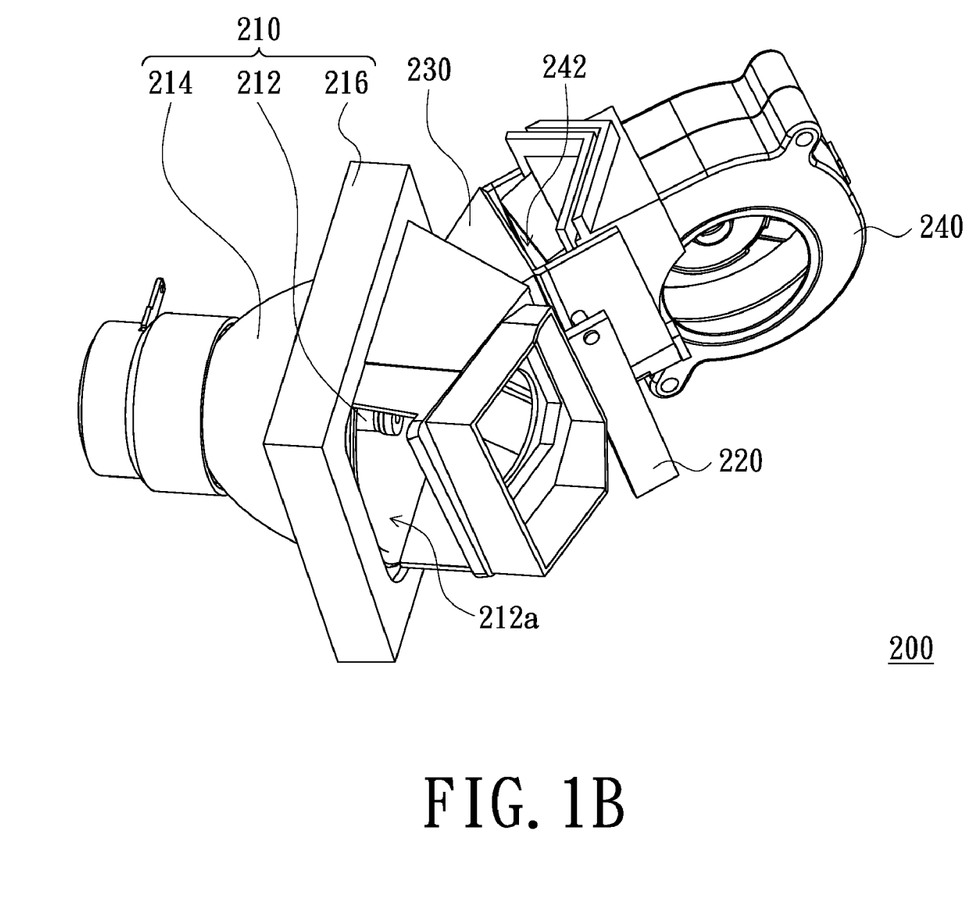
FIG. 1B is a schematic three-dimensional view of an illumination module of the projector of FIG. 1A.
Figure 1C:
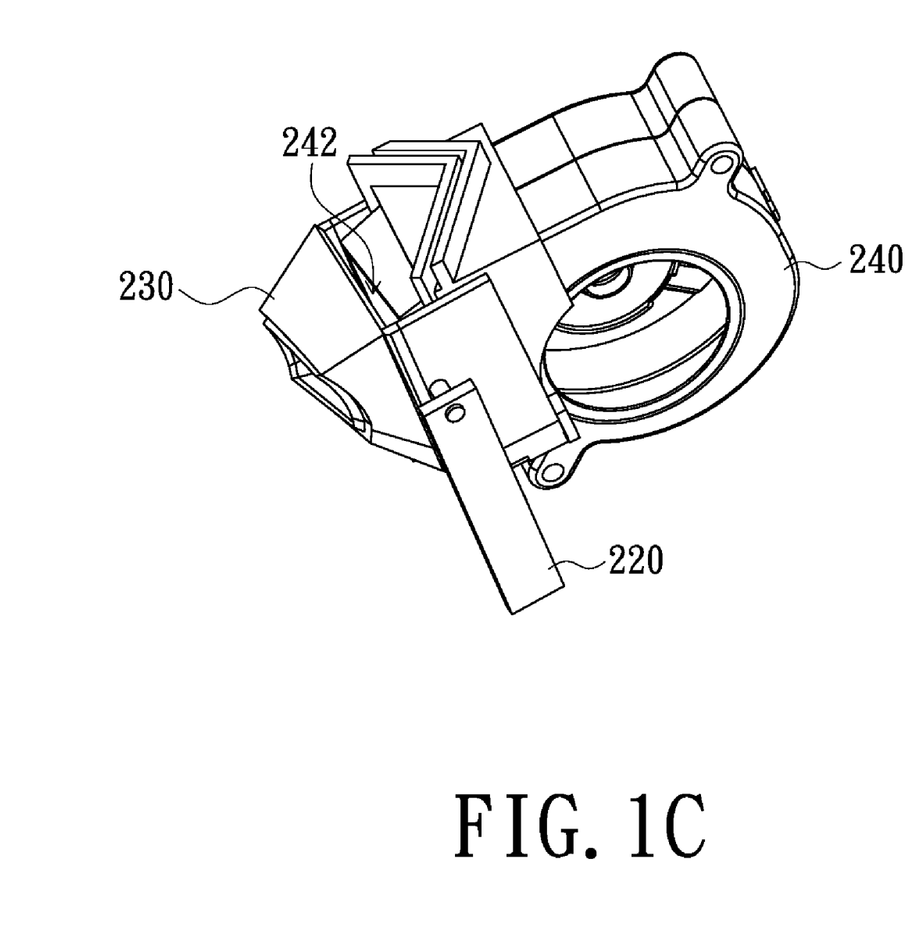
FIG. 1C is a schematic three-dimensional view of the disposition of a supporting element, a guiding tube and an airflow generator of the illumination module of FIG. 1B.

FIG. 1A is a schematic view of a projector in accordance with a first embodiment of the invention. FIG. 1B is a schematic three-dimensional view of an illumination module of the projector of FIG. 1A. FIG. 1C is a schematic three-dimensional view of the disposition of a supporting element, a guiding tube and an airflow generator of the illumination module of FIG. 1B. Referring to FIG. 1A, FIG. 1B and FIG. 1C, the projector P2 of the embodiment includes a casing 100, an illumination module 200, a light valve 300 and a projection lens 400. The illumination module 200 is disposed in the casing 100. The illumination module 200 includes a light source 210, a supporting element 220, a guiding tube 230 and an airflow generator 240. The light source 210 includes a reflector 212, a lampwick 214 and a dust-proof cover 216. The light source 210 is fixed in the casing 100. The reflector 212 has a light emitting opening 212a. The dust-proof cover 216 is disposed at the light emitting opening 212a. At least a portion of the lampwick 214 is disposed in the reflector 212. The lampwick 214 is capable of generating an illumination beam L2.

The supporting element 220 is fixed in the casing 100. In other words, the supporting element 220 is fixed relative to the light source 210. The supporting element 220 can be integrally formed with the casing 100. The guiding tube 230 is pivoted to the supporting element 220 and adjacent to the light source 210. The airflow generator 240 has an airflow outlet 242. The airflow generator 240 is fixed in the casing 100. In other words, the airflow generator 240 is fixed relative to the light source 210. In addition, the airflow outlet 242 of the airflow generator 240 is adjacent to the guiding tube 230.

The light valve 300 is disposed in the casing 100. The light valve 300 is located in a transmission path of the illumination beam L2 and capable of converting the illumination beam L2 into an image beam 12. The projection lens 400 is disposed on the casing 100. The projection lens 400 is located in a transmission path of the image beam 12 and capable of projecting the image beam 12 onto a screen S2.

Figure 1D:
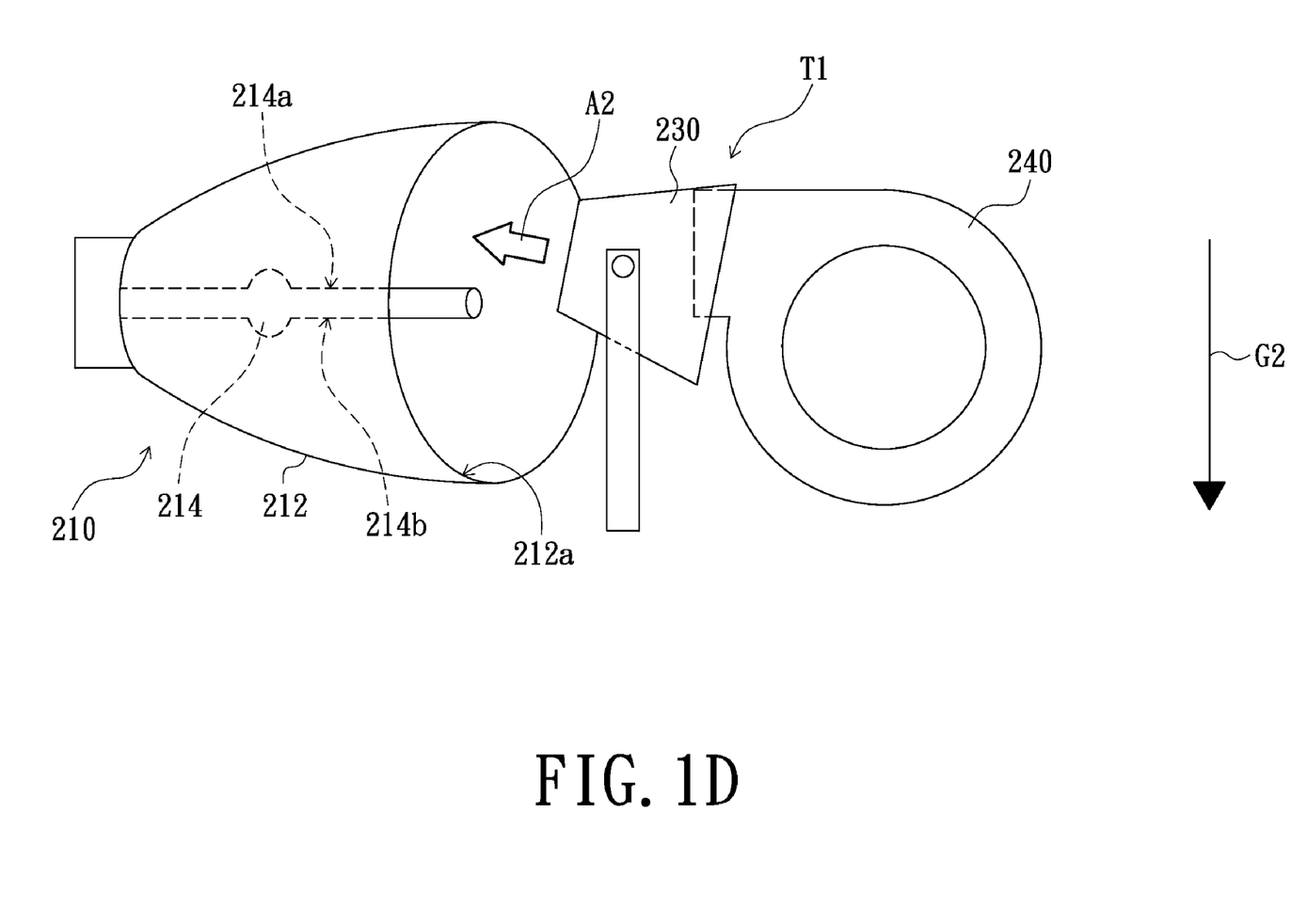
FIG. 1D is a schematic side view of the illumination module of FIG. 1B which is used in a first state.
Figure 1E:
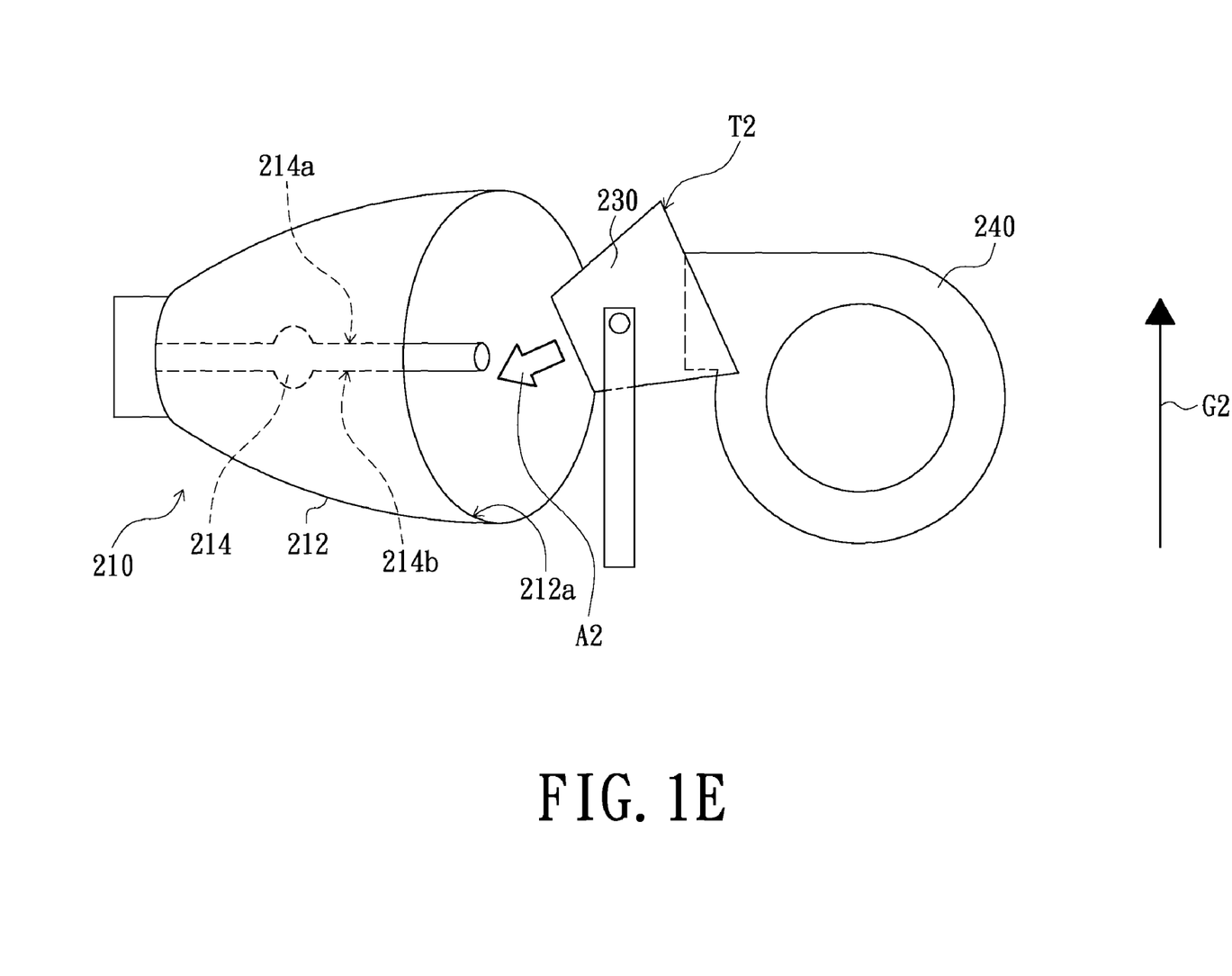
FIG. 1E is a schematic side view of the illumination module of FIG. 1B which is used in a second state.

FIG. 1D is a schematic side view of the illumination module of FIG. 1B which is used in a first state. FIG. 1E is a schematic side view of the illumination module of FIG. 1B which is used in a second state. It should be noted that the dust-proof cover 216 is omitted in FIG. 1D and FIG. 1E for the convenience of description. Referring to FIG. 1D, if the operating illumination module 200 is used in a manner shown in FIG. 1D, i.e. the illumination module 200 is used in the upright state, the gravitational direction G2 is from a first surface 214a of the lampwick 214 to a second surface 214b of the lampwick 214 and the guiding tube 230 leans against the dust-proof cover 216 (shown in FIG. 1B) and is located at a first position T1 relative to the light source 210. At this time, an airflow A2 generated by the airflow generator 240 flows into the interior of the reflector 212 of the light source 210 through the guiding tube 230. In details, the airflow A2 is guided by the guiding tube 230 to flow through the light emitting opening 212a of the reflector 212 and into the interior of the reflector 212. Then, the airflow A2 flows past the first surface 214a of the lampwick 214 and flows out of the reflector 212 via the light emitting opening 212a. In another embodiment, a portion of the airflow A2 flows past the first surface 214a of the lampwick 214 and the portion of the airflow A2 can flow out of the reflector 212 via another opening opposite to the light emitting opening 212a of the reflector 212 but the above mentioned is not shown in any drawing. It should be noted that at this time, the first surface 214a of the lampwick 214 is an upper surface and the second surface 214b of the lampwick 214 opposite to the first surface 214a is a lower surface.

Referring to FIG. 1E, if the operating illumination module 200 is used in a manner shown FIG. 1E, i.e. the illumination module 200 is used in the upside-down state, the gravitational direction G2 is from the second surface 214b of the lampwick 214 to the first surface 214a of the lampwick 214 and the guiding tube 230 leans against the dust-proof cover 216 (shown in FIG. 1B) and is located at a second position T2 relative to the light source 210. At this time, the airflow A2 is guided by the guiding tube 230 to flow through the light emitting opening 212a of the reflector 212 and into the interior of the reflector 212. Then, the airflow A2 flows past the second surface 214b of the lampwick 214 and flows out of the reflector 212 via the light emitting opening 212a. In another embodiment, a portion of the airflow A2 flows past the second surface 214b of the lampwick 214 and the portion of the airflow A2 can flow out of the reflector 212 via another opening opposite to the light emitting opening 212a of the reflector 212 but the above mentioned is not shown in any drawing. It should be noted that at this time, the second surface 214b of the lampwick 214 is the upper surface and the first surface 214a of the lampwick 214 is the lower surface. In summary, the guiding tube 230 may be affected by the gravity of swinging between the first position T1 and the second position T2.

Furthermore, the size of an airflow inlet of the guiding tube 230 adjacent to the airflow outlet 242 of the airflow generator 240 can be larger than the size of the airflow outlet 242 of the airflow generator 240. In another embodiment, it can be achieved that the guiding tube 230 affected by the gravity swings between the first position T1 and the second position T2 by means of the motion that the airflow inlet of the guiding tube 230 leans against the airflow outlet 242 of the airflow generator 240.

The guiding tube 230 may be affected by the gravity to swing between the first position T1 and the second position T2 so that the airflow A2 can directly blow to a region adjacent to the upper surface of the lampwick 214. Therefore, more heat accumulating on the upper surface of the lampwick 214 due to the gravity effect can be dissipated from the light source 210 by the airflow A2 flowing into the reflector 212 via the guiding tube 230. Accordingly, the difference between the temperature of the upper surface and the temperature of the lower surface of the lampwick 214 can be controlled within a predetermined range such that the lampwick 214 can be prevented from being damaged due to overheating.

It should be pointed out that, in another embodiment, the airflow generator 240 can be fixed to the guiding tube 230 so that the airflow generator 240 is capable of swinging with the guiding tube 230. However, the above mentioned is not shown in any drawing.

[Second Embodiment]

Figure 2:
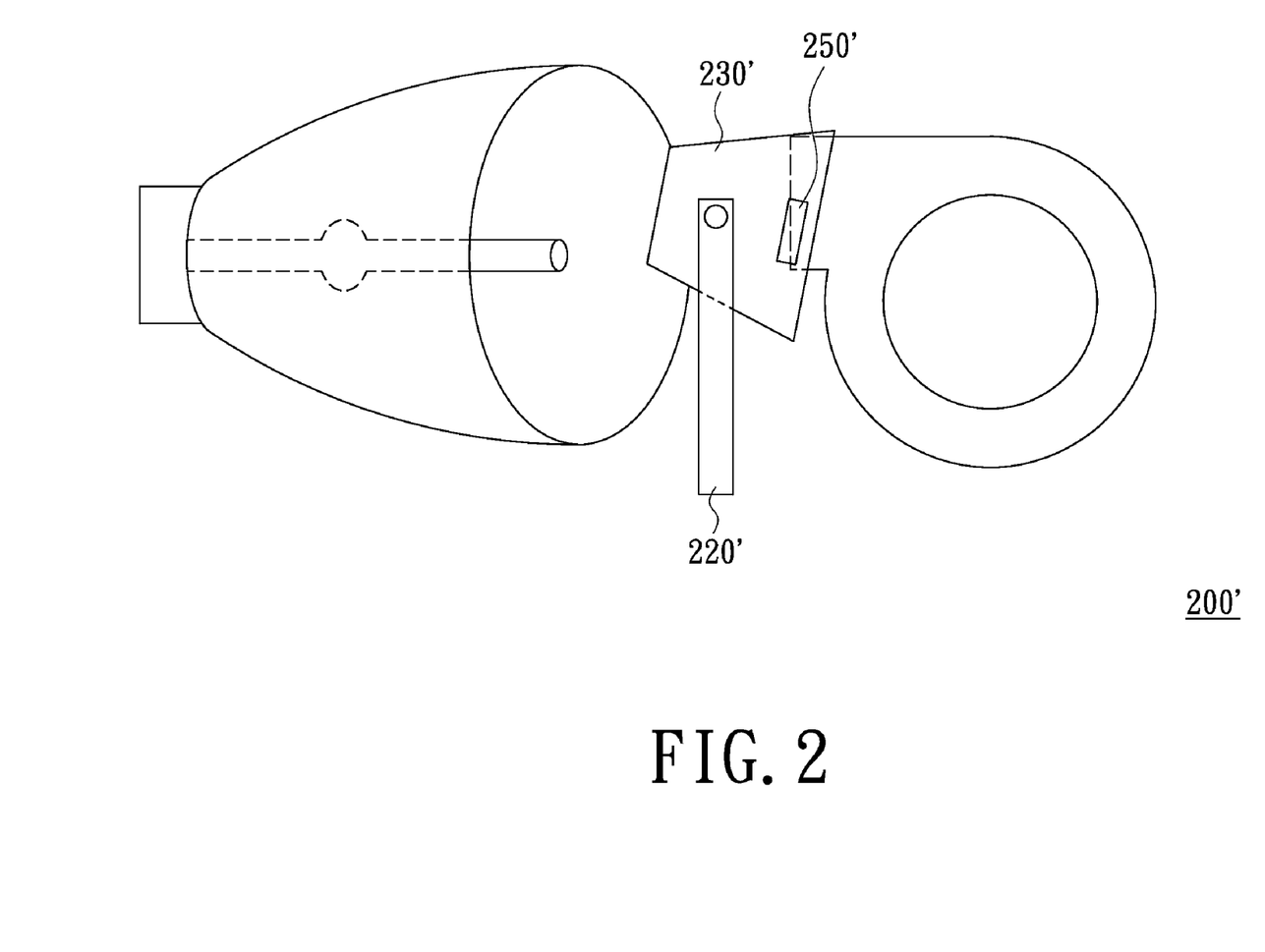
FIG. 2 is a schematic side view of an illumination module in accordance with a second embodiment of the invention.

FIG. 2 is a schematic side view of an illumination module in accordance with a second embodiment of the invention. Referring to FIG. 2, the difference between the illumination module 200' of the second embodiment and the illumination module 200 of the first embodiment lies in that the illumination module 200' further includes an additional weight structure 250' disposed on the guiding tube 230'. In the embodiment, the additional weight structure 250' is, for example, a metal block is fixed on the guiding tube 230'. The additional weight structure 250' is capable of generating a swinging torque relative to a pivot joint between the guiding tube 230' and the supporting element 220'. It should be noted that the invention is not limited herein, the additional weight structure 250' can be another article that provide weight affected by the gravity to swing the guiding tube 230'.

[Third Embodiment]

Figure 3:
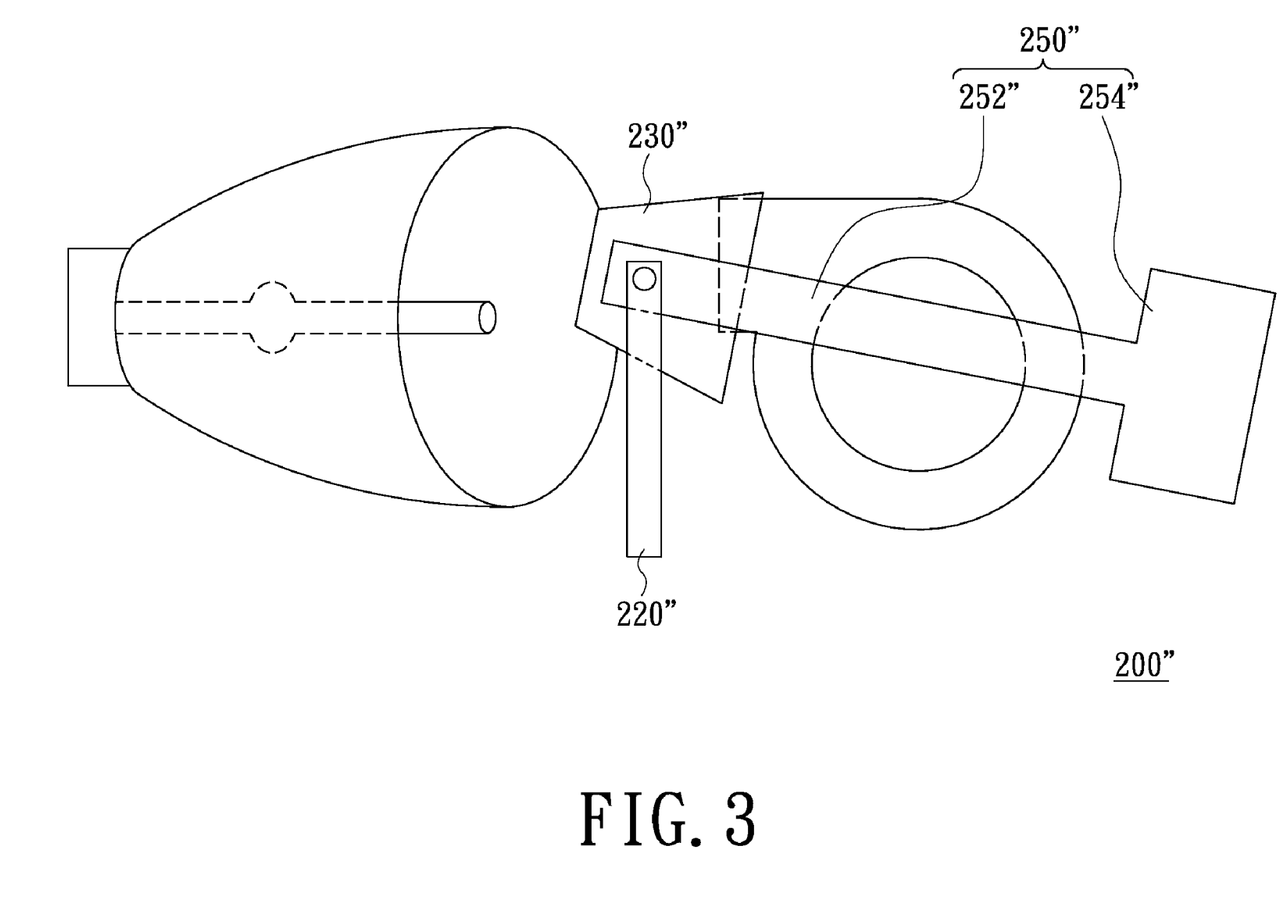
FIG. 3 is a schematic side view of an illumination module in accordance with a third embodiment of the invention.

FIG. 3 is a schematic side view of an illumination module in accordance with a third embodiment of the invention. Referring to FIG. 3, the difference between the illumination module 200" of the third embodiment and the illumination module 200' of the second embodiment lies in that an additional weight structure 250" of the illumination module 200" includes a rod 252" and a hammer 254". The rod 252" is fixed to the guiding tube 230". An end of the rod 252" and the guiding tube 230" are pivoted to the supporting element 220". The hammer 254" is disposed at the other end of the rod 252".

As mentioned above, each of the embodiments of the invention at least has one of the following advantages or other advantages. When the projector is used in various position states including a upright state and an upside-down state, the guiding tube may be affected by the gravity to swing between the first position and the second position such that the airflow can directly blow to a region adjacent to the upper surface of the light emitting element of the light source. Therefore, more heat accumulating on the upper surface of the light emitting element due to the gravity effect can be dissipated from the light source by the airflow guided by the guiding tube. Accordingly, the difference between the temperature of the upper surface and the temperature of the lower surface of the light emitting element can be controlled within a predetermined range such that the light source can be prevented from being damaged due to overheating.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An illumination module comprising:
   a light source;
   a supporting element fixed relative to the light source;
   a guiding tube pivoted to the supporting element and adjacent to the light source, wherein the guiding tube is capable of moving between a first position and a second position relative to the light source; and
   an airflow generator fixed relative to the light source and having an airflow outlet and capable of generating an airflow, wherein the airflow outlet is adjacent to the guiding tube and the airflow flows into the light source through the guiding tube, wherein an airflow inlet of the guiding tube is moved relative to the airflow outlet of the airflow generator when the guiding tube swings about a pivot joint between the guiding tube and the supporting element.

2. The illumination module according to claim 1, wherein the airflow generator is fixed to the guiding tube so that the airflow generator is capable of moving with the guiding tube.

3. The illumination module according to claim 1, further comprising an additional weight structure disposed at the guiding tube, wherein the additional weight structure is capable of generating a moving torque relative to the pivot joint between the guiding tube and the supporting element.

4. The illumination module according to claim 3, wherein the additional weight structure is a metal block fixed to the guiding tube.

5. The illumination module according to claim 3, wherein the additional weight structure comprises:
  a rod fixed to the guiding tube, wherein an end of the rod and the guiding tube are pivoted to the supporting element; and
  a hammer disposed at the other end of the rod.

6. A projector comprising:
  a casing;
  an illumination module disposed in the casing and comprising:
  a light source capable of generating an illumination beam;
  a supporting element fixed relative to the light source;
  a guiding tube pivoted to the supporting element and adjacent to the light source, wherein the guiding tube is capable of moving between a first position and a second position relative to the light source; and
  an airflow generator fixed relative to the light source and having an airflow outlet and capable of generating an airflow, wherein the airflow outlet is adjacent to the guiding tube and the airflow flows into the light source through the guiding tube, wherein an airflow inlet of the guiding tube is moved relative to the airflow outlet of the airflow generator when the guiding tube swings about a pivot joint between the guiding tube and the supporting element;
  a light valve disposed in the casing and located at a transmission path of the illumination beam, wherein the light valve is capable of converting the illumination beam into an image beam; and
  a projection lens disposed in the casing and located at a transmission path of the image beam, wherein the projection lens is capable of projecting the image beam onto a screen.

7. The projector according to claim 6, wherein the airflow generator is fixed to the guiding tube so that the airflow generator is capable of moving with the guiding tube.

8. The projector according to claim 6, wherein the illumination module further comprises an additional weight structure disposed at the guiding tube, the additional weight structure is capable of generating a moving torque relative to the pivot joint between the guiding tube and the supporting element.

9. The projector according to claim 8, wherein the additional weight structure is a metal block fixed to the guiding tube.

10. The projector according to claim 8, wherein the additional weight structure comprises:
  a rod fixed to the guiding tube, wherein an end of the rod and the guiding tube are pivoted to the supporting element; and
  a hammer disposed at the other end of the rod.

11. The projector according to claim 6, wherein the supporting element is integrally formed with the casing.

* * * * *